United States Patent [19]

Sesselmann

[11] Patent Number: 5,539,930

[45] Date of Patent: Jul. 30, 1996

[54] SYSTEM AND METHOD FOR ODOR ABSORPTION

[75] Inventor: Gregory J. Sesselmann, Muskegon, Mich.

[73] Assignee: ALS Enterprises, Inc., Muskegon, Mich.

[21] Appl. No.: 373,588

[22] Filed: Jan. 17, 1995

Related U.S. Application Data

[63] Continuation of Ser. No. 125,342, Sep. 22, 1993, Pat. No. 5,383,236, which is a continuation of Ser. No. 798,288, Nov. 25, 1991, abandoned.

[51] Int. Cl.$^6$ .................................................. A41D 13/02
[52] U.S. Cl. .................................................. 2/243.1; 2/69
[58] Field of Search .................................. 2/2, 1, 69, 79, 2/243.1, 272, 108, 84, 901

[56] References Cited

U.S. PATENT DOCUMENTS

| | | | |
|---|---|---|---|
| 3,783,085 | 1/1974 | Pearson et al. | 2/2 |
| 3,837,006 | 9/1974 | Laseman . | |
| 4,186,502 | 2/1980 | Foster . | |
| 4,244,059 | 1/1981 | Pflaumer | 2/400 |
| 4,302,899 | 12/1981 | DeHart . | |
| 4,455,187 | 6/1984 | von Blücher et al. . | |
| 4,790,040 | 12/1988 | Grilliot et al. . | |
| 4,901,370 | 2/1990 | Suda . | |
| 5,383,236 | 1/1995 | Sesselman | 2/69 |

FOREIGN PATENT DOCUMENTS 0144553  6/1985  European Pat. Off. .

OTHER PUBLICATIONS

Technical Bulletin SAr–1, "Saratoga In CD Protective Clothing", (Winfield Saratoga, Oct. 1984).
"Saratoga: A New Dimension in CB Protective Clothing," NBC Defense & Technology International, vol. 1, No. 2, May 1986, pp. 44–46.
"Saratoga: Carbon Pellet Technology in Chemical Warfare Protective Fabrics," Proc. 2nd Int. Symp. Protection Against Chemical Warfare Agents, Stockholm, Sweden, 15–19 Jun. 1986, pp. 67–76.
Bluecher, "The Saratoga™ Philosophy" (undated).
Technical Bulletin SAr–3, "Chemical Protective PBI Saratoga CWU/66P Air Force Flight Coverall," (Winfield Saratoga) Jun. 1989.
Blücher, "Status of Today–May 1991," undated.
"PBI Saratoga: New and Improved CWU/66P Chemical Protective Clothing System for Aircrew Application," (Alexandroff & Stanhope) (undated).

Primary Examiner—C. D. Crowder
Assistant Examiner—Gloria Hale
Attorney, Agent, or Firm—Varnum, Riddering, Schmidt & Howlett LLP

[57] ABSTRACT

Articles of clothing adapted to be worn by and to substantially surround at least a portion of a person. The articles of clothing absorb odors emanating from that portion of the person which is substantially surrounded by the clothing preventing odors from escaping to the atmosphere.

10 Claims, 3 Drawing Sheets

SYSTEM AND METHOD FOR ODOR ABSORPTION

This is a continuation, of application Ser. No. 08/125,342, now U.S. Pat. No. 5,383,236, filed Sep. 22, 1993 which is a continuation of application Ser. No. 07/798,288 filed Nov. 25, 1991, now abandoned.

BACKGROUND OF THE INVENTION

1. Field of the Invention

This invention relates to odor absorbing clothing and, more particularly, to a suit adapted to cover a portion or substantially the entire body of a person and absorb odors emanating from the person.

2. Description of the Related Art.

It is an unavoidable occurrence that humans emanate odors. The odors may originate from numerous sources including natural bodily secretions such as perspiration, oils, and the like; halitosis; colognes, perfumes, scented soaps, deodorants, shampoos, and the like; clothing worn by the individual; and odors that are absorbed by the individual's clothing and subsequently released to the surrounding environment. That a person emanates odors is not necessarily reflective of his personal hygiene but is simply an unassailable fact of human existence.

Numerous cosmetic and health care products have been developed to mask the more unpleasant odors. Colognes, perfumes, scented soaps, deodorants and the like which are employed for such purposes do nothing more than mask the undesirable odor and replace it with one that is considered more pleasing. In certain situations, however, it is desirable to provide an odorless or scentless presence. For example, certain people must have the ability to approach wild game in close proximity. Such persons include hunters, naturalists, wildlife photographers, wildlife biologists, wildlife political activists, and law-enforcement personnel charged with the responsibility of protecting wild game from injury, poaching and the like.

It is well known that wild game have a keenly developed sense of smell that can readily distinguish odors that are not indigenous to their natural habitat. Such odors may include those emanating from humans who attempt to gain close proximity to the game. Perfumes, scented soaps, and colognes may mask odors but are themselves readily detected by the wild game, perhaps at even greater distances. Such scents are not natural to the animals and therefore they are either scared away or alerted to the presence of potential danger.

One attempt to mask these odors is found in hunter's aids in the form of sponge-like pads that can be repeatedly impregnated with an artificially or naturally based aromatic scent such as deer lure. Examples of such devices are disclosed in U.S. Pat. No. 4,186,502, issued Feb. 5, 1982 to L. Foster and U.S. Pat. No. 4,302,899, issued Dec. 1, 1981 to G. DeHart. These devices function by distributing a scent that wild game find attractive but they do nothing to mask or absorb the odors emanating from the person. With time, the attractive powers of the lure diminish thereby decreasing its effectiveness. Moreover, the wild game may sense both the attractant and the odors emanating from the person. These prior devices are not acceptable because they do nothing to eliminate the scents indigenous to humans.

There has been a long-felt need for some device that is adapted to readily, efficiently and effectively absorb human odors such that a user presents a virtually odorless or scentless appearance, thereby enabling one to approach wild game in close proximity.

SUMMARY OF THE INVENTION

This invention relates to a method and system for odor absorption including articles of clothing adapted to be worn by and substantially surround at least a portion of a person, the articles comprising means for absorbing odors emanating from that portion of the person which is substantially surrounded by the clothing. The clothing articles may comprise inner and outer layers with the odor absorbing means being enclosed therebetween. The odor absorbing means may include an odor absorbing agent selected from the group consisting of activated charcoal, chlorophyll, baking soda, activated alumina, soda lime, zeolite, calcium oxide, potassium permanganate or a similar substance. The odor absorbing means may be in the form of a fabric layer having the odor absorbing agent incorporated therein, the fabric layer being received or enclosed between the inner and outer layers of the clothing article. The inner and outer layers of the clothing articles may be similar or dissimilar and may be selected from the group consisting of cotton, polypropylene, wool, felt, polyester or a laminate comprising polytetrafluoroethylene bonded to a suitable fabric. In another embodiment, the articles of clothing may be formed of a polymeric foam that is impregnated with the odor absorbing means.

Articles of clothing that may be constructed in accordance with the invention include a covering for the head, a covering for the upper body, a covering for the lower body, a covering for the hand, and a covering for the foot and boot. An article of clothing according to the invention may also comprise a body suit adapted to substantially envelop at least upper and lower body portions of a person. Similarly, articles such as backpacks, fanny packs and the like may incorporate odor absorbing means to absorb the odors of the articles inside.

The odor absorbing system according to the invention comprises an article of clothing adapted to be worn by a person and an accessory storage pack adapted to enclose various articles. The article of clothing substantially surrounds at least a portion of the person wearing the clothing and comprises a base layer of an air permeable material and an odor absorbing agent provided on the base layer. Similarly, the accessory storage pack comprises a base layer of air permeable material and an odor absorbing agent provided on the base layer. Naturally occurring odors emanating from the person and the articles stored in the pack are absorbed by the odor absorbing agent provided on the clothing and storage pack. The combination of the storage pack and accessory clothing provides efficient means for avoiding detection by wildlife.

In another aspect, the invention comprises a method of avoiding detection by wildlife using the sense of smell. The method comprises the steps of providing an odor absorbing article of clothing and donning the article of clothing so that at least a portion of a person is substantially surrounded by the article. The article of clothing comprises a base layer of an air permeable material and an odor absorbing agent provided on the base layer. The odor absorbing agent is provided in an amount sufficient to absorb the naturally occurring odors emanating from the person wearing the article, thereby making detection of the person by wildlife through the sense of smell more difficult.

BRIEF DESCRIPTION OF THE DRAWINGS

The invention will now be described with reference to the drawings in which.

DESCRIPTION OF THE PREFERRED EMBODIMENT

Figure 1:
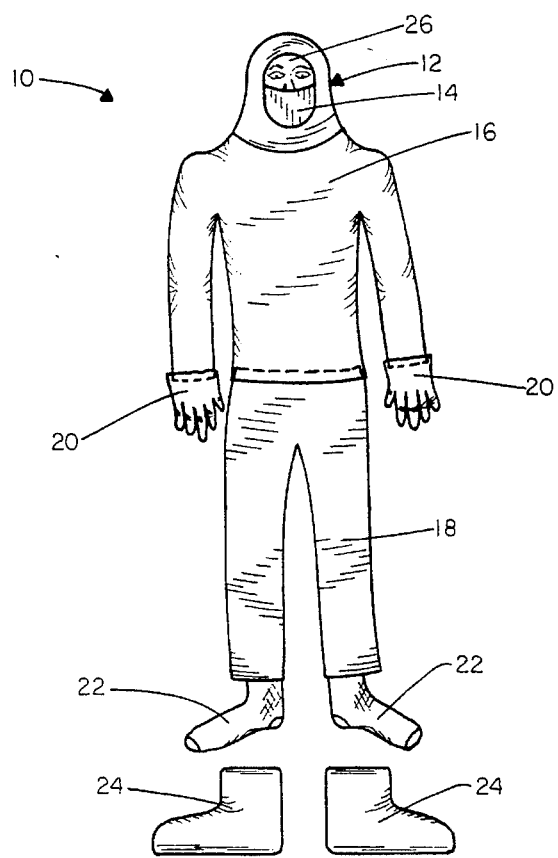
FIG. 1 is an elevational view of a person shown in conjunction with several articles of clothing in partially exploded array and constructed in accordance with the invention.
Figure 6:
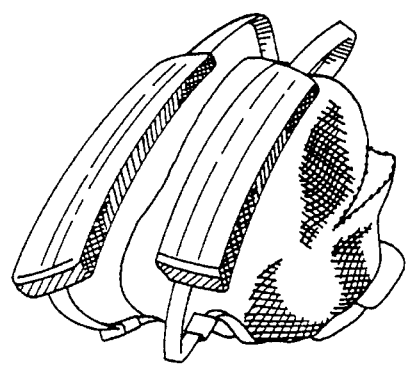
FIG. 6 is a perspective view of a backpack in accordance with the invention.
Figure 7:
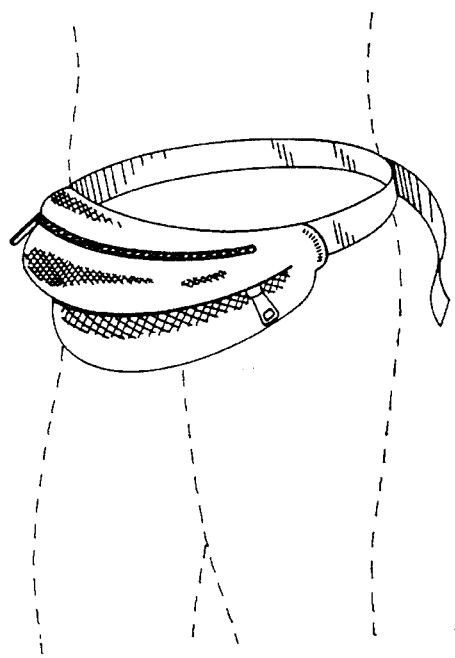
FIG. 7 is a perspective view of a fanny pack in accordance with the invention.

Turning now to the drawings and in particular to FIG. 1, a person 10 is shown in conjunction with several articles of clothing, each of which, as explained more fully below, when constructed in accordance with the invention is adapted to absorb odors emanating from the person. The particular articles of clothing illustrated in FIG. 1 include a head covering 12, a breath shield 14, an upper body or torso cover 16, a lower body cover 18, gloves or mittens 20, foot covers or socks 22, and boot or shoe covers 24. Similarly, articles such as backpacks 50 (FIG. 6), fanny packs 52 (FIG. 7) and the like may incorporate odor absorbing means to absorb the odors of the materials stored therein.

The head covering 12 is adapted to substantially cover the entire head of the person 10 as well as the neck region. Preferably, an open portion 26 is provided in order that the person 10 may see. The breath shield 14 may be incorporated directly into the head covering 12 by stitching or adhesive bonding or may be in the form of a separate article of clothing similar to surgical masks and the like employed by physicians.

The upper body cover 16 is adapted to cover the torso and waist regions of the person 10 as well as the arms and shoulders. Similarly, the lower body cover 18 is adapted to cover the waist and pelvic regions 10 as well as the legs. The upper and lower body covers 16, 18 may comprise individual articles of clothing that overlap in the area of the waist or may be in the form of a one-piece body suit.

The gloves or mittens 20 may be worn over the hands and preferably overlap those portions of the upper body cover 16 that envelop the arms of the wearer. Similarly, the socks may be worn over the feet of the individual 10 and function as foot covers. Finally, the boot or shoe covers 24 commonly known as "gators" may be adapted to be worn over clad feet and may be provided with heels, soles or the like if desired.

The individual articles of clothing may be sized to conform to the person wearing the clothing although it is preferred that they be made large enough to be capable of being worn comfortably by a person dressed in otherwise conventional clothing. The individual articles of clothing may be thermally insulated or made water-repellent or water-resistant if desired although this is not required to successfully practice the invention. Similarly, the articles of clothing may be provided with an appropriate camouflaging color scheme so that the person 10 wearing clothing constructed according to the invention may blend more readily into the surrounding environment. Alternatively, it may be desired to provide the articles of clothing with a bright and highly visible color so that the person 10 will be easily observable by other people such as hunters.

Figure 2:
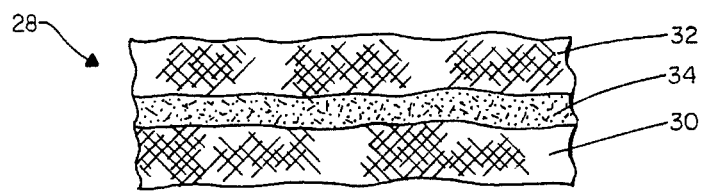
FIG. 2 is a cross-sectional view through an article of clothing constructed in accordance with the invention, showing the construction thereof in greater detail.
Figure 3:
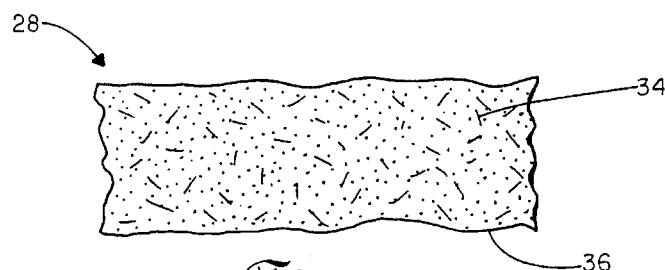
FIG. 3 is a cross-sectional view through an article of clothing having a first alternative construction in accordance with the invention.
Figure 4:
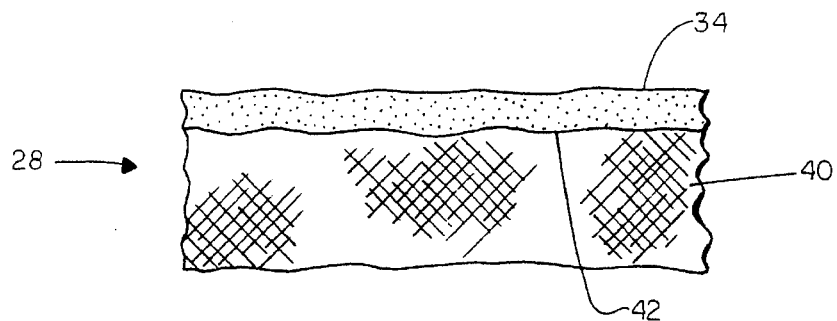
FIG. 4 is a cross-sectional view through an article of clothing having a second alternative construction in accordance with the invention.
Figure 8:
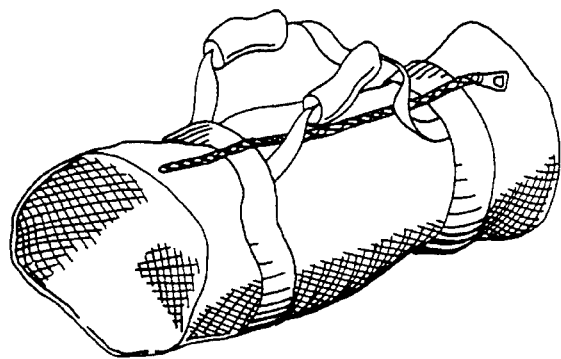
FIG. 8 is a perspective view of a duffle bag in accordance with the invention.

Each of the articles of clothing identified above has a substantially similar construction in cross section, which construction is shown in greater detail in FIGS. 2–4. To assist the description hereinafter, the reference numeral 28 in FIGS. 2–4 identifies an article of clothing generally. It will be understood that the article of clothing identified generally in FIGS. 2–4 by the reference numeral 28 may comprise any of the articles of clothing described hereinabove including the head covering 12, the breath shield 14, the upper body cover 16, the lower body cover 18, the gloves, mittens or hand covers 20, the socks or foot covers 22, the boot or shoe covers 24, or a duffle or knapsack 56 (FIG. 8).

In the embodiment illustrated in FIG. 2, the article of clothing 28 comprises an inner layer 30 and an outer layer 32 having enclosed therebetween means 34 for absorbing odors of the wearer. The odor absorbing means 34 may be in the form of fibers treated with or having incorporated therein activated carbon or charcoal. A suitable example of such odor absorbing means is commercially marketed under the name Garfil-615 by Purification Products Ltd. of Great Britain and distributed in the United States by Filter-X, Inc. of Harrisburg, Pa. Preferably, the amount of activated charcoal is in the range of 5 $g/m^2$ to 120 $g/m^2$. Alternatively, the odor absorbing means could be in the form of chlorophyll, baking soda, activated alumina, soda lime, zeolite, calcium oxide, potassium permanganate or a similar substance.

The inner and outer layers 30, 32 of the clothing article 28 may be similar or dissimilar and may comprise cotton, polypropylene, wool, felt, polyester, TYVEK® or GORE-TEX®, a laminate comprising polytetrafluoroethylene bonded to a suitable fabric and commercially marketed by W. L. Gore & Associates, Inc., Newark, Del. The various materials for the inner and outer layers 30, 32 may be, non-woven, closely woven, comprise a fine mesh or be fabricated in some other suitable manner. The inner and outer layers 30, 32 may be secured to each other by stitching, quilting, needling or adhesive bonding at appropriate and conventional locations (not shown separately in the drawings) such as seams.

In one embodiment, the inner and outer layers 30, 32 may be in the form of a needled, non-woven polyester fabric, each layer having a weight of approximately 10 to 12 oz./sq. yd. and a thickness of approximately 1/16". The odor absorbing means may be provided by a layer of Garfil-615 having a weight of approximately 10–12 oz./sq. yd.

Alternatively, as best shown in FIG. 3, the article of clothing 28 may be in the form of a foam of latex or other polymer 36 that has been impregnated with the odor absorbing means 34, such as activated charcoal. Whatever materials are selected for the ultimate construction of the article of clothing 28, the article should preferably be durable, flexible, abrasion resistant, easy to manufacture, nontoxic, nonflammable, and capable of carrying or retaining substantial amounts of the appropriate odor absorbing means 34.

A further embodiment of the article of clothing is seen in FIG. 4. In this embodiment, a base material 40 has a layer of odor absorbing means 34 bonded to a first surface 42. Preferably, the layer of odor absorbing means 34 is mounted on the outer surface of the base material, although mounting the odor absorbing means on the inner surface of the base material is acceptable. The odor absorbing means 34 may be mounted on the base material 40 by a "printing" process wherein the odor absorbing substance, such as activated charcoal, is mixed with a bonding agent and then printed on the base material 40 by a silk-screen printing process. An example of this process is disclosed in U.S. Pat. No. 4,510,193 to Blucher et al., issued Apr. 9, 1985.

The person 10 may choose to wear some or all of the articles of clothing described above and illustrated in FIG. 1. The degree of odor absorption increases as the surface area of the body of the person 10 covered by the articles of clothing increases. Thus, the most effective odor absorbing arrangement will comprise the head covering 12, the breath shield 14, the upper body cover 16, the lower body cover 18, the gloves or mittens 20, the socks or foot covers 22, and the boot or shoe covers 24. Although effective odor absorption may be realized by wearing only some of the articles of clothing, the person 10 will preferably wear all of the articles of clothing described above to provide a more-or-less total-coverage body suit.

Figure 5:
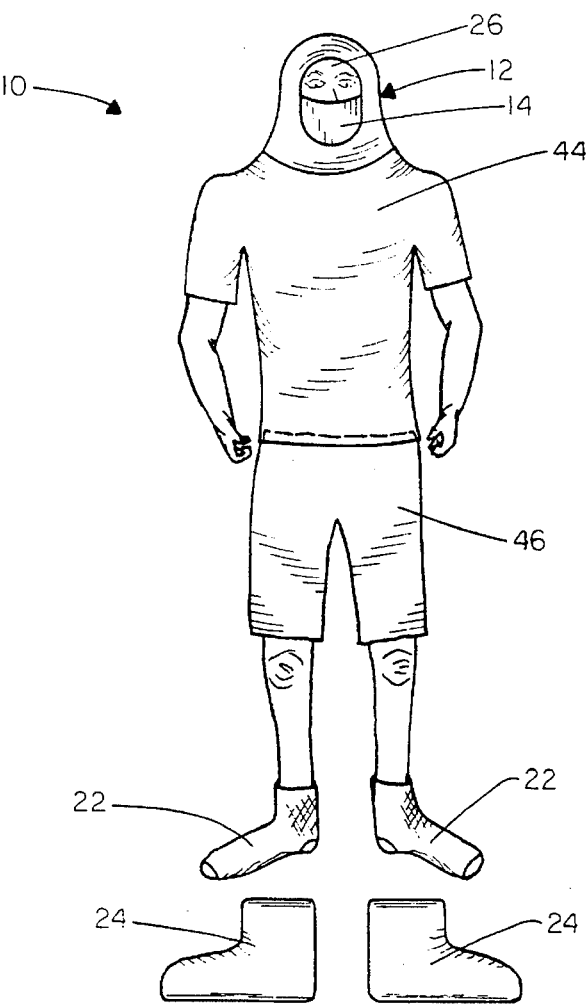
FIG. 5 is an elevational view of a person shown in conjunction with several articles of clothing constructed in accordance with the invention.

In warm weather climates, it may be desirable to cover only a portion of the person 10. FIG. 5 shows an alternative embodiment of the suit according to the invention. In this embodiment, the person 10 wears an upper body cover 44 and a lower body cover 46. The upper body 44 cover is analogous to a short-sleeve shirt wherein the person's chest, torso, shoulders and underarms are covered. The lower body cover 46 comprises a pair of shorts which cover the pelvic or groin region and a portion of the legs of the person 10. The embodiment seen in FIG. 5 may be enhanced by adding one or more of the head covering 12, the breath shield 14, the gloves 20, the foot covers 22 or the shoe covers 24.

It may be desirable to provide additional odor absorbing means 34 for those articles of clothing adjacent to body parts that are more likely to emanate readily detectable odors such as the underarms and pelvic regions. In this case, an enhanced layer of the odor absorbing means can be mounted to the article of clothing 28 in the underarm or pelvic regions. For example, two layers of activated charcoal in the amount of 50 g/m² may be mounted one on top of the other to create a total of 100 g/m² for enhanced odor absorption in one or more sensitive areas.

The articles of clothing according to the invention may be worn as an outer layer of clothing, as an inner layer, or intermediate outer and inner layers of otherwise conventional clothing.

It has been found that activated charcoal used as the odor absorbing means 34 may be reactivated for numerous cycles of use. This reactivation can occur merely by washing and drying the article of clothing 28. Washing and drying helps to remove impurities and foreign articles bonded to the activated charcoal.

Reasonable variations or modifications are possible within the spirit of the foregoing specification and drawings without departing from the scope of the invention which is defined in the accompanying claims.

The embodiments of the invention in which an exclusive property or privilege is claimed are defined as follows:

1. An odor absorption system adapted to be used by a person to avoid detection by wildlife through the sense of smell comprising:
   an article of clothing adapted to be worn by said person and to substantially surround at least a portion of said person, the article comprising:
   a base layer of an air permeable material; and
   an odor absorbing agent provided on the base layer; and
   an accessory storage pack adapted to enclose various articles, the accessory storage pack comprising;
   a base layer of an air permeable material; and
   an odor absorbing agent provided on the base layer;
   wherein naturally occurring odors emanating from said person and the various articles are absorbed by the odor absorbing agent of the article of clothing and accessory storage pack, respectively, such that detection of said person and the articles contained in the storage pack by the sense of smell will be more difficult.

2. An odor absorption system according to claim 1 wherein the accessory storage pack comprises a backpack.

3. An odor absorption system according to claim 1 wherein the accessory storage pack comprises a fanny pack.

4. An odor absorption system according to claim 1 wherein the accessory storage pack comprises a duffle bag.

5. A method of avoiding detection by wildlife using the sense of smell comprising the steps of:
   providing an odor absorbing article of clothing comprising:
   a base layer of an air permeable material; and
   an odor absorbing agent provided on the base layer, the odor absorbing agent being provided on the base layer in an amount sufficient to absorb the naturally occurring odors emanating from a person wearing said article; and
   donning the article of clothing such that at least a portion of said person is substantially surrounded by the article and at least a portion of the naturally occurring odors emanating from said person will be absorbed by the article of clothing thereby making detection of the person by the sense of smell more difficult.

6. A method of avoiding detection by wildlife according to claim 5 and further comprising the step of positioning the article of clothing as the outermost layer of clothing worn by said person.

7. A method of avoiding detection by wildlife according to claim 6 and further comprising the step substantially enveloping at least upper and lower portions of said person with said article of clothing.

8. A method of avoiding detection by wildlife according to claim 7 and further comprising the step of providing an odor absorbing cover for the mouth of said person.

9. A method of avoiding detection by wildlife according to claim 6 and further comprising the step of reactivating the odor absorbing means by washing and drying the article of clothing.

10. A method of avoiding detection by wildlife according to claim 5 and further comprising the steps of:
    providing an accessory storage pack comprising:
    a base layer of an air permeable material; and
    an odor absorbing agent provided on the base layer; and
    placing accessory articles in the accessory storage pack such that naturally occurring odors emanating from the accessory articles are absorbed by the odor absorbing agent thereby making detection of the articles by the sense of smell more difficult.

* * * * *

UNITED STATES PATENT AND TRADEMARK OFFICE
CERTIFICATE OF CORRECTION

PATENT NO. : 5,539,930
DATED : July 30, 1996
INVENTOR(S) : GREGORY J. SESSELMANN It is certified that error appears in the above-indentified patent and that said Letters Patent is hereby corrected as shown below:

Column 6, claim 9, line 52 "6" should be "5".

Signed and Sealed this

Twenty-ninth Day of October 1996

Attest:

BRUCE LEHMAN

*Attesting Officer*  *Commissioner of Patents and Trademarks*

US005539930C1

(12) EX PARTE REEXAMINATION CERTIFICATE (7767th)
United States Patent
Sesselmann

(10) Number: US 5,539,930 C1
(45) Certificate Issued: *Sep. 28, 2010

(54) SYSTEM AND METHOD FOR ODOR ABSORPTION

(75) Inventor: Gregory J. Sesselmann, Muskegon, MI (US)

(73) Assignee: ALS Enterprises, Inc., Muskegon, MI (US)

Reexamination Request:
No. 90/007,331, Nov. 30, 2004

Reexamination Certificate for:
Patent No.: 5,539,930
Issued: Jul. 30, 1996
Appl. No.: 08/373,588
Filed: Jan. 17, 1995

( * ) Notice: This patent is subject to a terminal disclaimer.

Certificate of Correction issued Oct. 29, 1996.

Related U.S. Application Data

(63) Continuation of application No. 08/125,342, filed on Sep. 22, 1993, now Pat. No. 5,383,236, which is a continuation of application No. 07/798,288, filed on Nov. 25, 1991, now abandoned.

(51) Int. Cl.
*A41D 13/02* (2006.01)

(52) U.S. Cl. .............................. 2/243.1; 2/69
(58) Field of Classification Search ...................... 422/5; 442/96, 123; 2/94, 904
See application file for complete search history.

(56) References Cited

U.S. PATENT DOCUMENTS

| | | | |
|---|---|---|---|
| 2,959,789 A | | 11/1960 | Mills et al. |
| 3,130,416 A | * | 4/1964 | Mitchell et al. ................... 2/79 |
| 3,200,427 A | | 8/1965 | Daley |
| 3,333,585 A | * | 8/1967 | Barghini et al. ........ 128/201.13 |
| 3,586,596 A | | 6/1971 | Ainsworth et al. |
| 3,744,534 A | | 7/1973 | Henry et al. |
| 3,850,785 A | | 11/1974 | McQuade et al. |
| 3,852,897 A | | 12/1974 | Bridge et al. |
| 3,903,259 A | | 9/1975 | Hart |
| 3,920,020 A | | 11/1975 | Kraskin |

(Continued)

FOREIGN PATENT DOCUMENTS

| | | |
|---|---|---|
| DE | 2951827 A1 | 7/1981 |
| DE | 3304349 A1 | 8/1984 |
| DE | 3924034 A1 | 1/1991 |
| DE | 4003765 A1 | 8/1991 |
| EP | 0099758 | 2/1984 |
| EP | 0118618 B1 | 11/1986 |
| EP | 0260841 A1 | 3/1988 |
| EP | 0053936 | 4/1989 |
| GB | 1173143 | 10/1969 |
| GB | 1301101 | 12/1972 |
| GB | 2067095 A | 7/1981 |
| GB | 2127389 | 4/1984 |
| GB | 2207390 A | 2/1989 |
| WO | WO 97/46878 | 12/1997 |

OTHER PUBLICATIONS www.robinsonoutdoors.com/osc/scentcontrol.php, "U of Stink", printed Dec. 14, 2006, 6 pages.*
www.ext.vt.edu, "A Glossary of Water–Related Terms", printed Dec. 15, 2005, 13 pages.*
Hawley's Condensed Chemical Dictionary, 14th Edition, 2002, selected exerpts.*
www.trmichaels.com/activatedcarbonscience.htm, from the TRMichaels.com Webring on Activated Carbon suits, printed Dec. 13, 2006, 32 pages.*

(Continued)

*Primary Examiner*—Jeffrey R. Jastrzab

(57) ABSTRACT

Articles of clothing adapted to be worn by and to substantially surround at least a portion of a person. The articles of clothing absorb odors emanating from that portion of the person which is substantially surrounded by the clothing preventing odors from escaping to the atmosphere.

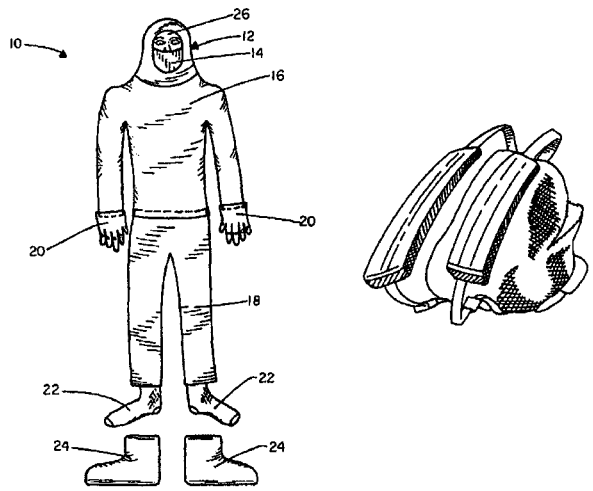

U.S. PATENT DOCUMENTS

| | | | | | |
|---|---|---|---|---|---|
| 3,922,723 | A | * | 12/1975 | Popper | 2/113 |
| 3,959,556 | A | | 5/1976 | Morrison | |
| 4,045,609 | A | | 8/1977 | Hart | |
| 4,046,939 | A | | 8/1977 | Hart | |
| 4,067,210 | A | | 1/1978 | Arons et al. | |
| 4,099,342 | A | | 7/1978 | Singh | |
| 4,117,552 | A | | 10/1978 | Simpson | |
| 4,182,335 | A | * | 1/1980 | Matrullo | 604/365 |
| 4,186,499 | A | | 2/1980 | Massok, Jr. et al. | |
| 4,217,386 | A | | 8/1980 | Arons et al. | |
| 4,228,549 | A | * | 10/1980 | Rispoli | 2/239 |
| 4,285,068 | A | * | 8/1981 | Ross | 2/202 |
| 4,343,853 | A | | 8/1982 | Morrison | |
| 4,433,024 | A | | 2/1984 | Eian | |
| 4,454,191 | A | | 6/1984 | von Blücher et al. | |
| 4,460,708 | A | | 7/1984 | Stuetz | |
| 4,504,290 | A | | 3/1985 | Pontius | |
| 4,510,193 | A | | 4/1985 | Blücher et al. | |
| 4,515,761 | A | * | 5/1985 | Plotzker | 423/240 R |
| 4,525,410 | A | | 6/1985 | Hagiwara et al. | |
| 4,539,982 | A | | 9/1985 | Bailly | |
| 4,565,727 | A | | 1/1986 | Giglia et al. | |
| 4,609,245 | A | * | 9/1986 | Sakschek | 239/36 |
| 4,617,230 | A | | 10/1986 | Shah et al. | |
| 4,663,780 | A | | 5/1987 | Rawlings et al. | |
| 4,677,019 | A | | 6/1987 | von Blücher | |
| 4,715,857 | A | | 12/1987 | Juhasz et al. | |
| 4,722,477 | A | * | 2/1988 | Floyd | 239/36 |
| 4,797,318 | A | | 1/1989 | Brooker et al. | |
| 4,810,102 | A | * | 3/1989 | Norton | 383/4 |
| 4,817,594 | A | | 4/1989 | Juhasz | |
| 4,856,111 | A | | 8/1989 | Sholes | |
| 4,860,382 | A | | 8/1989 | Markwell | |
| 4,872,220 | A | | 10/1989 | Haruvy et al. | |
| 4,874,129 | A | | 10/1989 | DiSapio et al. | |
| 4,883,021 | A | | 11/1989 | Ducharme et al. | |
| 4,917,301 | A | | 4/1990 | Munteanu | |
| H823 | H | | 10/1990 | Conkle et al. | |
| 4,982,467 | A | | 1/1991 | Mizusawa et al. | |
| 5,002,183 | A | * | 3/1991 | Okano | 206/287 |
| 5,009,308 | A | * | 4/1991 | Cullen et al. | 206/204 |
| 5,017,424 | A | | 5/1991 | Farnworth et al. | |
| 5,022,553 | A | | 6/1991 | Pontius | |
| 5,024,008 | A | * | 6/1991 | Maples | 36/136 |
| 5,025,507 | A | * | 6/1991 | Kirby | 2/206 |
| 5,042,088 | A | | 8/1991 | Sherrod et al. | |
| 5,085,914 | A | | 2/1992 | Perdelwitz, Jr. et al. | |
| 5,092,008 | A | | 3/1992 | Okubo | |
| 5,103,500 | A | | 4/1992 | Nager et al. | |
| 5,112,666 | A | | 5/1992 | Langston | |
| 5,117,821 | A | | 6/1992 | White | |
| 5,129,735 | A | | 7/1992 | Neal et al. | |
| 5,154,960 | A | | 10/1992 | Mucci et al. | |
| 5,159,718 | A | * | 11/1992 | Moyer | 2/69 |
| 5,161,686 | A | | 11/1992 | Weber et al. | |
| 5,165,964 | A | | 11/1992 | Imai | |
| 5,183,656 | A | | 2/1993 | Uesaka et al. | |
| 5,539,930 | A | | 7/1996 | Sesselman | |
| 5,585,107 | A | * | 12/1996 | Vickers | 424/402 |
| 5,678,247 | A | | 10/1997 | Vickers | |
| 5,790,987 | A | | 8/1998 | Sesselman | |
| 6,009,559 | A | | 1/2000 | Sesselman | |
| 6,134,718 | A | | 10/2000 | Sesselman | |

OTHER PUBLICATIONS

Declaration of Gregoy J. Sesselmann, dated Apr. 3, 2003.

Notice of Litigation Involving Subject Matter for Which a Patent is Being Sought.

Gary Tate's Chemical Warfare Equipment Page, http://www.seanet.com/~gtate/cwappar.htm (printed Nov. 17, 1999).

Derek Griffiths, "The Mark IV: State–of–the–Art in British NBC Protection," Nuclear, Biological and Chemical Defense and Technology International, 1987, pp. 37–40, vol. 2, No. 1, NBC Defense International Ltd., New York, NY.

David Hughes, "USAF May Speed Production of New Suits to Protect Crews from Chemical Weapons," Aviation Week & Space Technology, Aug. 20, 1990, pp. 27–.

"Charcoal Cloth Comes of Age for Body Protection," The ASA Newsletter, Apr. 3, 1992, p. 13, Issue No. 29 (Ed. Colonel Richard Price).

"British Breakthrough—Garfil Nonwovens," Nonwovens Industry, Apr. 1984, pp. 10–14, vol. 15, No. 4, Rodman Publications, Inc., Ramsey, NJ.

Kim et al., "Development of Improved Permeable and Impermeable Material for Chemical Protective Clothing," 88 pgs., Jun. 1985, Celanese Research Company, Summit, New Jersey.

Military Specification—Cloth, Twill, Camouflage Pattern, Cotton and Nylon for Desert Uniform, MIL–C–44034C, Mar. 28, 1986.

Military Specification—Suit, Chemical Protective, MIL–S–43926H, Mar. 25, 1988.

Military Specification—Suit, Chemical Protective, MIL–S–43926J, Aug. 30, 1991.

Military Specification—Cloth, Camouflage Pattern: Woodland, Cotton and Nylon, MIL–C–44031, Sep. 26, 1980.

Military Specification—Cloth, Laminated, Nylon Tricot Knit, Polyurethane Foam Laminate, Chemical Protective and Flame Resistant, MIL–C–43858B (GL), Jan. 16, 1986.

Gilbert et al., "Activated Carbon Fabric Prepared by Pyrolysis and Activation of Phenolic Fabric," Textile Research Journal, Jan. 1975, p. 91, vol. 45, No. 1, Textile Research Institute, Princeton, New Jersey.

Arons et al., "Sorptive Textile Systems Containing Activated Carbon Fibers," Textile Research Journal, Nov. 1974, pp. 874–883, vol. 44, No. 11, Textile Research Institute, Princeton, New Jersey.

Arons et al., "Sorption Characteristics of Activated Carbon Fabric," Textile Research Journal, Sep. 1973, pp. 539–543, vol. 43, No. 9, Textile Research Institute, Princeton, New Jersey.

Arons et al., "Activated Carbon Fiber and Fabric Achieved by Pyrolysis and Activation of Phenolic Precursors," Textile Research Journal, Jan. 1972, pp. 60–63, vol. 42, No. 1, Textile Research Institute, Princeton, New Jersey.

OdorGard, "Disappearing Act," Buck Masters (dated at least as early as Jan. 3, 1992) (Advertisement).

Hunter's Edge Outfitters, "The Hunter's Edge Story," 2 pgs. (dated at least as early as Mar. 28, 1994).

"Hunter's Edge Markets Scent–Absorbing Suit," Sunday Montgomery Advertiser, Dec. 6, 1992, Business Section, Montgomery, Alabama.

Original Scent Shield, http://www.bowhunting.net/scent-shield, Robinson Laboratories, Inc. (print date unknown).

Chemical Warfare Defense Handbook, Nov. 1989.

Advertisement for Scent Control Powder, Buckmasters's Whitetail Magazine, Nov. 1991, p. 75 (1 page).

Whitetail Hunting, Jim Dawson, p. 87 (3 pages total), 1982.

Outdoor Life Deer Hunter's Yearbook, p. 28 (3 pages total), 1989.

Daul, George C. et al., "Studies on the Partial Carboxymethylation of Cotton," Textile Research Journal, Dec. 1952, pp. 787–792 with cover and table of contents pages, vol. XXII, No. 12, Textile Research Institute, New York, NY.

Guthrie, John D., "Introduction of Amino Groups into Cotton Fabric by Use of 2–Aminoethylsulfuric Acid," Textile Research Journal, Nov. 1947, pp. 625–629.

Guthrie, John D., "Ion Exchange Cottons," Industrial and Engineering Chemistry, Sep. 1952, pp. 2187–2189.

Jurgens, Julian F. et al., "Phosphorylated Cotton Cellulose as a Cation–Exchange Material," Textile Research Journal, Jan. 1948, pp. 42–44.

Reeves, Wilson A. et al., "Aminization of Cotton," Textile Research Journal, Aug. 1953, pp. 522–527.

Reeves, Wilson A. et al., "Chemical and Physical Properties of Aminized Cotton," Textile Research Journal, Aug. 1953, pp. 527–532.

Facsimile received from unknown third party dated Aug. 7, 2006 containing statement of an unknown individual, Richard Mellor, regarding odor absorption.

Undated, unsigned letter received by Applicant's counsel on Feb. 17, 2006 containing anonymous statement regarding sales of chemical warfare suits along with the following enclosures (a) ebay search results dated Feb. 6, 2006; (b) copy of a photograph of mailing envelope and chemical warfare suit and (c) a close–up photograph of chemical warfare suit bearing a fabric date of Feb. 1986 and a second date of Sep. 1986.

E–mail from T.R. Michels, dated, Nov. 27, 2006, 2 pages.

Dawson, Jim; *Whitetail Hunting;* 1982; cover page, copyright page, pp. 20–22, 86–88, 95–97; Stackpole Books, Harrisburg, PA.

Miller, Greg, "Bucks and B.O.," *Outdoor Life Deer Hunter's Yearbook,* 1990, cover and pp. 25–30.

"Read the Story," printed from website www.myfoxtwincities.com, article created and edited Nov. 9, 2006, 2 pages.

* cited by examiner

US 5,539,930 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE
SPECIFICATION AFFECTED BY AMENDMENT
ARE PRINTED HEREIN.

Column 2, lines 5-26:

This invention relates to a method and system for odor absorption including articles of clothing adapted to be worn by and substantially surround at least a portion of a person, the articles comprising means for absorbing odors emanating from that portion of the person which is substantially surrounded by the clothing. The clothing articles may comprise inner and outer layers with the odor absorbing means being enclosed therebetween. The odor absorbing means may include an odor absorbing agent selected from the group consisting of activated charcoal, chlorophyll, baking soda, activated alumina, soda lime, zeolite, calcium oxide, potassium permanganate or a similar substance. *As used herein, the term "absorb" and its cognates (e.g., absorbed, absorbing and absorption) refers generically to the action of absorption and of adsorption for the agents in the previous substance.* The odor absorbing means may be in the form of a fabric layer having the odor absorbing agent incorporated therein, the fabric layer being received or enclosed between the inner and outer layers of the clothing article. The inner and outer layers of the clothing articles may be similar or dissimilar and may be selected from the group consisting of cotton, polypropylene, wool, felt, polyester or a laminate comprising polytetrafluoroethylene bonded to a suitable fabric. In another embodiment, the articles of clothing may be formed of a polymeric foam that is impregnated with the odor absorbing means.

Column 4, lines 23-36:

In the embodiment illustrated in FIG. 2, the article of clothing 28 comprises an inner layer 30 and an outer layer 32 having enclosed therebetween means 34 for absorbing odors of the wearer. The odor absorbing means 34 may be in the form of fibers treated with or having incorporated therein activated carbon or charcoal. A suitable example of such odor absorbing means is commercially marketed under the name Garfil-615 by Purification Products Ltd. of Great Britain and distributed in the United States by [Filter-X] *FILTEREX*, Inc. of [Harrisburg] *Shippensburg*, Pa. Preferably, the amount of activated charcoal is in the range of 5 g/m.sup.2 to 120 g/m.sup.2. Alternatively, the odor absorbing means could be in the form of chlorophyll, baking soda, activated alumina, soda lime, zeolite, calcium oxide, potassium permanganate or a similar substance.

AS A RESULT OF REEXAMINATION, IT HAS BEEN DETERMINED THAT:

Claims 1-10 are cancelled.

New claims 11-50 are added and determined to be patentable.

*11. A method of avoiding detection by wildlife using the sense of smell comprising:*

*providing an odor absorbing article of clothing comprising:*

*a base layer of an air permeable material; and*

*activated charcoal secured to the base layer by a bonding agent, the activated charcoal being provided on the base layer in an amount sufficient to absorb the naturally occurring odors emanating from a person wearing the article of clothing; and*

*wearing the article of clothing while hunting wildlife such that at least a portion of said person is substantially surrounded by the article and at least a portion of the naturally occurring odors emanating from said person will be absorbed by the article of clothing thereby making detection of the person by wildlife through the sense of smell more difficult.*

*12. A method of avoiding detection by wildlife according to claim 11 and further comprising positioning the article of clothing as the outermost layer of clothing worn by said person.*

*13. A method of avoiding detection by wildlife according to claim 11 and further comprising substantially enveloping at least a torso of said person with said article of clothing.*

*14. A method of avoiding detection by wildlife according to claim 11 and further comprising providing an odor absorbing cover for the mouth of said person.*

*15. A method of avoiding detection by wildlife using the sense of smell comprising:*

*providing an odor absorbing article of clothing comprising:*

*a base layer of an air permeable material; and*

*activated charcoal secured to the base layer by adhesive, the activated charcoal being provided on the base layer in an amount sufficient to absorb the naturally occurring odors emanating from a person wearing the article of clothing;*

*wearing the article of clothing while hunting wildlife such that at least a portion of said person is substantially surrounded by the article and at least a portion of the naturally occurring odors emanating from said person will be absorbed by the article of clothing thereby making detection of the person by wildlife through the sense of smell more difficult; and*

*reactivating said activated charcoal through washing and drying of the article of clothing.*

*16. A method of avoiding detection by wildlife according to claim 15 and further comprising positioning the article of clothing as the outermost layer of clothing worn by said person.*

*17. A method of avoiding detection by wildlife according to claim 15 and further comprising substantially enveloping at least a torso of said person with said article of clothing.*

*18. A method of avoiding detection by wildlife according to claim 15 and further comprising providing an odor absorbing cover for the mouth of said person.*

*19. A method of avoiding detection by wildlife using the sense of smell comprising:*

*providing an odor absorbing article of clothing comprising:*

*an inner layer of an air permeable material;*

*an outer layer of an air permeable material; and*

*an odor absorbing agent positioned between the inner and outer layers of air permeable material, wherein one of the inner and outer layers is a base layer and the odor absorbing agent is provided on the base* layer in an amount sufficient to absorb the naturally occurring odors emanating from a person wearing the article of clothing;

wearing the article of clothing while hunting wildlife such that at least a portion of said person is substantially surrounded by the article and at least a portion of the naturally occurring odors emanating from said person will be absorbed by the article of clothing thereby making detection of the person by wildlife through the sense of smell more difficult; and reactivating said odor absorbing agent through washing and drying of the article of clothing.

20. A method of avoiding detection by wildlife according to claim 19 and further comprising positioning the article of clothing as the outermost layer of clothing worn by said person.

21. A method of avoiding detection by wildlife according to claim 19 and further comprising substantially enveloping at least a torso of said person with said article of clothing.

22. A method of avoiding detection by wildlife according to claim 19 and further comprising providing an odor absorbing cover for the mouth of said person.

23. A method of avoiding detection by wildlife according to claim 19 wherein the odor absorbing agent comprises activated charcoal.

24. A method of avoiding detection by wildlife according to claim 19 wherein the odor absorbing agent is selected from the group consisting of activated charcoal, activated alumina, zeolite, soda lime and calcium oxide.

25. A method of avoiding detection by wildlife according to claim 19 and further comprising substantially enveloping at least a groin region of said person with said article of clothing.

26. A method of avoiding detection by wildlife according to claim 12 and further comprising substantially enveloping at least a groin region of said person with said article of clothing.

27. A method of avoiding detection by wildlife according to claim 16 and further comprising substantially enveloping at least a groin region of said person with said article of clothing.

28. A method of avoiding detection by wildlife using the sense of smell comprising:

providing an odor absorbing article of clothing comprising:
a base layer of an air permeable material; and
activated charcoal secured to the base layer by adhesive and provided on the base layer in an amount sufficient to absorb the naturally occurring odors emanating from a person wearing the article of clothing to enable the person wearing the article of clothing to be in close proximity to wildlife; and wearing the article of clothing while hunting wildlife such that at least a portion of the person is substantially surrounded by the article and at least a portion of the naturally occurring odors emanating from the person will be absorbed by the article of clothing thereby making detection of the person by wildlife through the sense of smell more difficult.

29. A method of avoiding detection by wildlife according to claim 28 further comprising reactivating said activated charcoal through washing and drying of the article of clothing.

30. A method of avoiding detection by wildlife according to claim 28 and further comprising positioning the article of clothing as the outermost layer of clothing worn by said person.

31. A method of avoiding detection by wildlife according to claim 28 and further comprising substantially enveloping a torso of said person with said article of clothing.

32. A method of avoiding detection by wildlife according to claim 31 and further comprising providing an odor absorbing cover for the mouth of said person.

33. A method of avoiding detection by wildlife according to claim 28 and further comprising substantially enveloping at least a groin region of said person with said article of clothing.

34. An odor absorption system adapted to be used by a person to avoid detection by wildlife through the sense of smell comprising:

an article of clothing adapted to be worn by said person and to substantially surround at least a portion of said person, the article comprising:
a base layer of an air permeable material; and
activated charcoal secured to the base layer by adhesive provided in an amount to effectively absorb human odors to enable a person wearing the article of clothing to be in close proximity to wildlife; and an accessory storage pack adapted to enclose various articles, the accessory storage pack comprising:
a base layer of an air permeable material; and
activated charcoal provided on the base layer;

wherein naturally occurring odors emanating from said person and the various articles are absorbed by the odor absorbing agent of the article of clothing and accessory storage pack, respectively, such that detection of said person and the articles contained in the storage pack by wildlife through the sense of smell will be more difficult.

35. An odor absorption system according to claim 34 wherein the accessory storage pack comprises a backpack.

36. An odor absorption system according to claim 34 wherein the accessory storage pack comprises a fanny pack.

37. An odor absorption system according to claim 34 wherein the accessory storage pack comprises a duffle bag.

38. An odor absorption system according to claim 34 wherein the activated charcoal of the article of clothing is capable of reactivation through washing and drying of the article of clothing.

39. A method of avoiding detection by wildlife using the sense of smell comprising:

providing an odor absorbing article of clothing comprising:
an inner layer of an air permeable material;
an outer layer of an air permeable material; and
activated charcoal positioned between the inner and outer layers of air permeable material and secured by adhesive to at least one of the inner and outer layers of air permeable material, wherein said at least one of the inner and outer layers is a base layer and the activated charcoal is provided on the base layer in an amount sufficient to absorb the naturally occurring odors emanating from a person wearing the article of clothing; and wearing the article of clothing while hunting wildlife such that at least a portion of said person is substantially surrounded by the article and at least a portion of the naturally occurring odors emanating from said person will be absorbed by the article of clothing thereby making detection of the person by wildlife through the sense of smell more difficult.

40. A method of avoiding detection by wildlife according to claim 39 and further comprising reactivating said activated charcoal through washing and drying of the article of clothing.

41. A method of avoiding detection by wildlife according to claim 40 and further comprising positioning the article of clothing as the outermost layer of clothing worn by said person.

42. A method of avoiding detection by wildlife according to claim 40 and further comprising substantially enveloping at least a torso of said person with said article of clothing.

43. A method of avoiding detection by wildlife according to claim 42 and further comprising providing an odor absorbing cover for the mouth of said person.

44. A method of avoiding detection by wildlife according to claim 40 and further comprising substantially enveloping at least a groin region of said person with said article of clothing.

45. A method of avoiding detection by wildlife using the sense of smell comprising:
   providing an odor absorbing article of clothing comprising:
      an inner layer of an air permeable material;
      an outer layer of an air permeable material; and
      activated charcoal secured by adhesive to at least one of the inner and outer layers of air permeable material and provided in an amount to effectively absorb human odors to enable a person wearing the article of clothing to be in close proximity to wildlife; and
   wearing the article of clothing while hunting wildlife such that at least a portion of said person is substantially surrounded by the article and at least a portion of the naturally occurring odors emanating from said person will be absorbed by the article of clothing thereby making detection of the person by wildlife through the sense of smell more difficult.

46. A method of avoiding detection by wildlife according to claim 45 and further comprising reactivating said activated charcoal through washing and drying of the article of clothing.

47. A method of avoiding detection by wildlife according to claim 46 and further comprising positioning the article of clothing as the outermost layer of clothing worn by said person.

48. A method of avoiding detection by wildlife according to claim 46 and further comprising substantially enveloping at least a torso of said person with said article of clothing.

49. A method of avoiding detection by wildlife according to claim 41 and further comprising providing an odor absorbing cover for the mouth of said person.

50. A method of avoiding detection by wildlife according to claim 46 and further comprising substantially enveloping at least a groin region of said person with said article of clothing.

* * * * *